United States Patent [19]
Lian et al.

[11] Patent Number: 5,429,895
[45] Date of Patent: Jul. 4, 1995

[54] NICKEL ALLOY ELECTRODES FOR ELECTROCHEMICAL DEVICES

[75] Inventors: Ke K. Lian, Northbrook; Lijun Bai, Vernon Hills, both of Ill.

[73] Assignee: Motorola, Inc., Schaumburg, Ill.

[21] Appl. No.: 322,130

[22] Filed: Oct. 13, 1994

[51] Int. Cl.[6] .............. H01M 4/58; C22C 19/05; H01G 9/04
[52] U.S. Cl. .................. 429/223; 429/221; 429/218; 429/224; 420/900; 361/508; 361/509; 361/516
[58] Field of Search .............. 429/209, 218, 221, 223, 429/224; 420/900; 361/508, 509, 516, 528, 529, 532

[56] References Cited

U.S. PATENT DOCUMENTS 4,623,597 11/1986 Sapru et al. .................. 429/218
5,071,720 12/1991 Notten .......................... 429/218

FOREIGN PATENT DOCUMENTS 0078404 9/1982 European Pat. Off. .

Primary Examiner—John Niebling
Assistant Examiner—Bruce F. Bell
Attorney, Agent, or Firm—Kenneth M. Massarnoi

[57] ABSTRACT

A nickel alloy material for use as a cathode of an electrochemical charge storage device (10) provides significantly higher charge densities than available in prior art devices. The nickel alloy electrode (30) includes a host matrix material such as nickel, molybdenum, chromium, and combinations thereof, and at least one modifier element selected from the group consisting of cobalt, iron, aluminum, titanium, tungsten, vanadium, zirconium, niobium, and combinations thereof. The rechargeable electrode material may be incorporated into a charge storage device such as an electrochemical capacitor, and including an electrode fabricated of the material (30), an anode (20), and an electrolyte (40) disposed therebetween.

20 Claims, 7 Drawing Sheets

NICKEL ALLOY ELECTRODES FOR ELECTROCHEMICAL DEVICES

TECHNICAL FIELD

This invention relates in general to the field of electrochemical devices including batteries and electrochemical capacitors, and more particularly, to materials which may be employed as electrodes therein.

BACKGROUND

Electrochemical capacitors are a class of high-rate, energy storage/discharge devices which use electrolytes and electrodes of various kinds in a system similar to that of a conventional battery. Electrochemical capacitors, like batteries, are essential energy storage devices. However, unlike batteries, capacitors rely on charge accumulation at the electrode/electrolyte interface to store energy. Charge storage in electrochemical capacitors, therefore, is a surface phenomenon. Conversely, charge storage in batteries is a bulk phenomenon occurring in the bulk of the electrode material.

Electrochemical capacitors can generally be divided into two sub-categories: double layer capacitors in which the interfacial capacitance at the electrode/electrolyte interface can be modeled as two parallel sheets of charge; and pseudocapacitor devices in which charge transfer between the electrolyte and the electrode occurs over a wide potential range. These charge transfers are the result of primary, secondary, and tertiary oxidation/reduction reactions between the electrode and the electrolyte. These types of electrochemical capacitors are being developed for high pulse power applications.

Most of the known pseudo-capacitor electrode materials are based on noble metal elements, such as ruthenium and iridium. These materials are generally quite expensive, which poses a significant hurdle to the widespread commercialization of this technology. Other less expensive materials have been tried but have been less than successful. For example, workers in the field have attempted to fabricate devices using pressed powder cobalt and cobalt oxide electrodes. However, these types of electrodes have failed for numerous reasons including, for example, poor life cycle performance and inability to achieve desired electrochemical characteristics.

Accordingly, there exists a need for a pseudocapacitive electrode material and device which delivers good performance in terms of energy storage, power density and cycle life. Moreover, such material should be abundant in nature, inexpensive in cost, readily processable into devices, and relatively benign environmentally.

DETAILED DESCRIPTION OF THE PREFERRED EMBODIMENT

Figure 1:
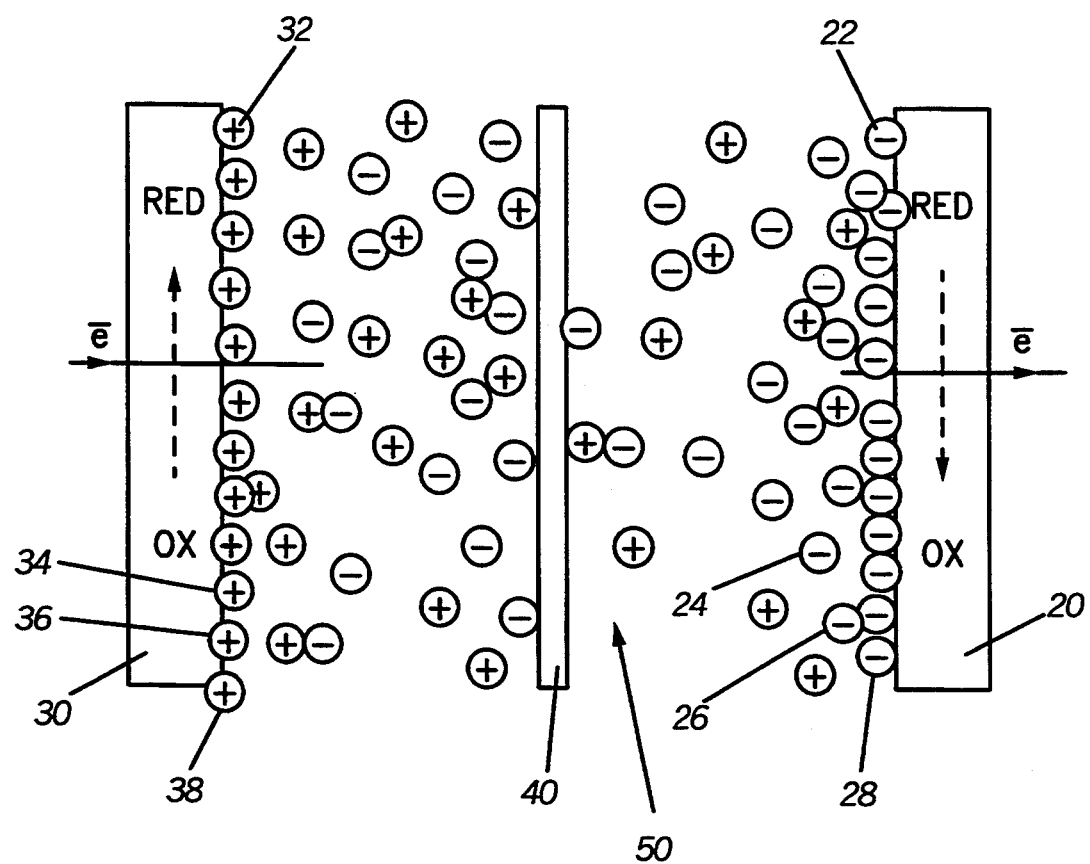
FIG. 1 is a schematic representation of a high-energy density electrochemical charge storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a representation of a high-energy density electrochemical capacitor device (10) such as a pseudocapacitor device, in accordance with the instant invention. The device (10) includes an anode (20), a cathode (30), and a separator (40) operatively disposed between the anode and the cathode. According to industry convention, the cathode is defined as the positive electrode, and the anode as the negative electrode during the discharging process. The roles are reversed during the charging process. Thus, references herein to the "cathode" refer to the electrode serving as the cathode during discharge.

Also disposed between the anode (20) and cathode (30) is an electrolyte (50) which is illustrated in FIG. 1 as an aqueous (liquid) electrolyte disposed entirely about both the anode (20) and the cathode (30). It is to be understood, however, that the electrolyte need not necessarily be an aqueous electrolyte but rather could be a non-aqueous electrolyte. In such an embodiment, the non-aqueous electrolyte would be disposed between the anode (20) and the cathode (30) in a manner similar to that illustrated with respect to the separator (40) in FIG. 1, though the anode and cathode would be disposed immediately adjacent to the separator/electrolyte.

In one preferred embodiment of the instant invention, the cathode (30) is fabricated of a nickel alloy material such as that described hereinbelow. The anode material may therefore be fabricated from any of a number of different materials known in the art, so long as such materials are compatible with the nickel alloy electrode cathode described herein. Examples of such materials include, but are not limited to, zinc, bismuth, cadmium, and their corresponding alloys, oxides, sulfides, sellinides, tellerides, and combinations thereof. The electrolyte used in connection with the electrochemical capacitor device in accordance with the instant invention may be an aqueous electrolyte such as an alkaline electrolyte, a neutral electrolyte, an acid electrolyte and combinations thereof. In one preferred embodiment, the electrolyte is 31% KOH. Conversely, the electrolyte may be a non-aqueous electrolyte such as acetonitrile, or may be selected from the group of materials comprising, $LiAlCl_4$, $LiClO_4$, $LiPF_6$, ethylene carbonates, and combinations thereof.

Similarly, the separator may be fabricated of a number of known separator materials as are practiced in the art. Specific examples of such separators include, but are not limited to, porous cellulose, porous silica, glass wool, glass fiber, polypropylene, and combinations thereof.

The schematic representation of the electrochemical capacitor device shown in FIG. 1 is used to explain the redox process occurring at the anode (20) and the cathode (30) of the device during operation. During charging, electrons, for example, (24, 26, 28) flow to the anode (20) as shown and the active material from which the anode (20) is formed undergoes a reduction process. The resulting charge imbalance, here an excess of negative charge, is balanced by the migration of positively charged ions (32, 34, 36, 38) from the electrolyte to cathode (30) as shown. While the reduction process occurs at the anode (20), a complimentary oxidation process takes place at the cathode, resulting in the ejection of at least one electron at the cathode surface. Both of the electrode processes occur at or near the electrode/electrolyte interface. During this process, ions pass through the porous separator (40). The entire scenario is then reversed during the discharge process of the device illustrated.

In accordance with the instant invention, there is provided an electrode material for use as, for example, the cathode, in the electrochemical device illustrated in FIG. 1. The electrode material may comprise a crystalline multiphase, multicomponent material having a host matrix material and at least one modifier element. The host matrix material may be selected from the group of materials selected from nickel (Ni), molybdenum (Mo), chromium (Cr), and combinations thereof. Similarly, the modifier element may be selected from the group consisting of cobalt (Co), iron (Fe), aluminum (Al), titanium (Ti), zirconium (Zr), niobium (Nb), vanadium (V), tungsten (W), and combinations thereof. Indeed, it is contemplated that more than one modifying element may be added to the host matrix material and having the formula:

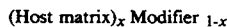

$$(\text{Host matrix})_x \text{ Modifier}_{1-x}$$

where x represents the present amount of host matrix material. The electrode material may be further described by the formula:

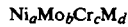

$$Ni_a Mo_b Cr_c M_d$$

where M is the modifier, a is between 30 and 90, b is between 10 and 50, c is between 0 and 50, and d is between 0 and 30, and wherein a, b, c, d are all expressed in weight percent.

It is contemplated that the multicomponent material may be crystalline or polycrystalline multiphase material, or an amorphous single phase material. In one preferred embodiment, the material will be a polycrystalline material characterized by a face-centered cubic crystalline structure. Alternatively, the face-centered cubic crystalline structure may be body-centered cubic, hexagonal close-packed, cubic, or combinations thereof. Indeed, different phases of the multi-phase material may be characterized by different crystalline structure.

It is known that a passive oxide layer forms on the surface of a pure nickel electrode in an alkaline solution. However, nickel alloys such as those described herein and particularly, nickel-chromium alloys have sites which are metastable and tend to be selectively dissolved on the electrode surface giving much greater charge capacity than in pure nickel metal electrodes. Further, by alloying nickel, which has a $3d^8$ structure, with chromium and molybdenum which have $3d^5$ and $4d^5$ structures respectively, the electronic structure of the alloy may be changed, enhancing the activity of the surface sites. Moreover, the selective dealloying process creates greater surface area on the nickel alloy electrodes. Greater surface area provides for more reaction sites and hence a high energy storage ability. As it is a fundamental characteristic of electrochemical capacitors, such as pseudocapacitors that the electrochemical reactions are substantially surface phenomena, hence, higher concentrations of active surface sites will yield better electrochemical capacity.

The nickel alloy materials described herein have at least about 60 times greater surface charge density than pure nickel electrodes in a 30% KOH solution, as will be shown in greater detail hereinbelow. In nickel-molybdenum, nickel-molybdenum-chromium, and nickel-molybdenum-chromium-cobalt alloys, the molybdenum/chromium and cobalt become active sites on the electrode surfaces yielding much higher charge capacity and better conductivity than pure nickel metal. Indeed, the charge density of the nickel alloys described herein are higher than the precious metal electrodes which are known in the prior art. For example, literature data for planar ruthenium and iridium electrodes are 60 and 12 $mC/cm^2$ respectively. Conversely, for a planar nickel/molybdenum alloy in accordance with the instant invention, the charge density is approximately 98 $mC/cm^2$. For nickel/chromium/molybdenum materials charge densities have been measured in the range of approximately 185 $mC/cm^2$, and nickel/chromium/molybdenum/cobalt alloys have charge densities measured in the range of 250 $mC/cm^2$. In addition to the performance advantage, the cost of nickel based alloy materials is generally substantially lower than precious metal materials such as iridium and ruthenium.

Exemplary nickel alloy materials according to the instant invention include but are not limited to $Ni_{58.5}Cr_{21}Mo13.5W_3Fe_4$; $Ni_{55.4}Cr_{19}Co_{11}Mo_{11}Al_{1.5}Ti_{3.1}$; $Ni_{69}Mo_{28}Fe_2Cr_1$; and $Ni_{58.7}Co_{13.5}Cr_{19.5}Mo_{4.3}Al_{1.3}, Ti_{3.0}$; The materials are expressed in weight percent.

EXAMPLES

The invention may be further understood in connection with the following examples.

Example I

A first nickel alloy having the composition $Ni_{58.5}Cr_{21}Mo_{13.5}W_3Fe_4$ was tested to determine its electrochemical properties. The material is commercially available as a light, strong, structural material, and is known as hastelloy C-22. A first sample of the material had a surface area of approximately 0.25 $cm^2$.

Figure 2:
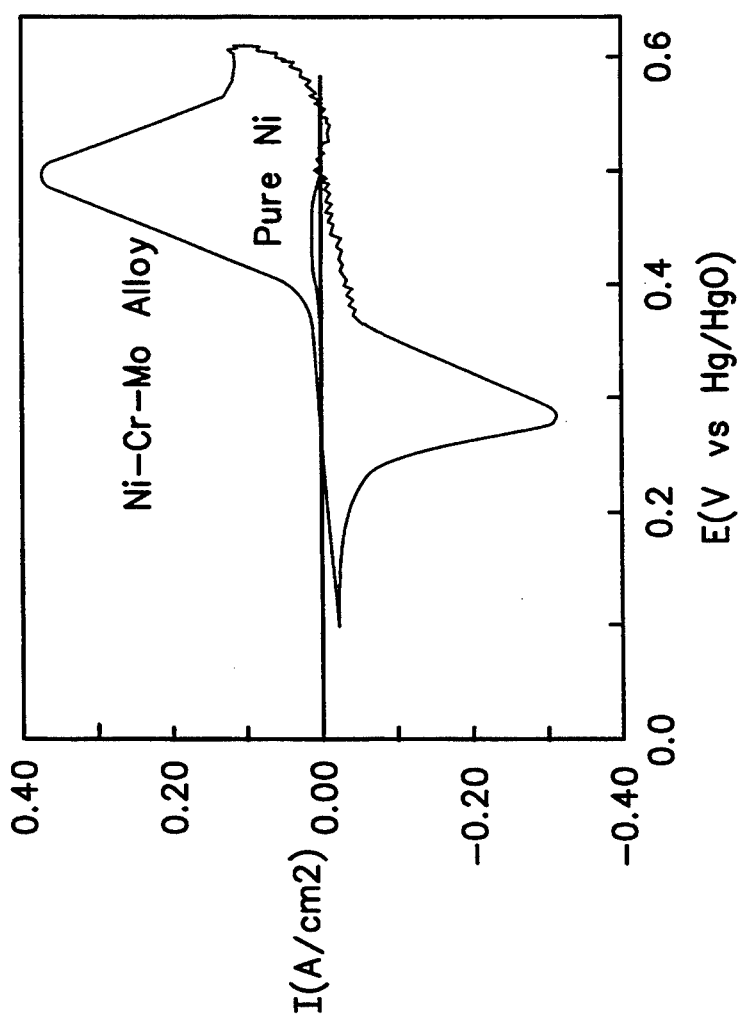
FIG. 2 illustrates the cyclic voltammagrams of a Ni—Cr—Mo alloy electrode and a pure Ni electrode tested in 31% KOH electrolyte at a sweep rate of 200 mV/s, in accordance with the instant invention.
Figure 3:
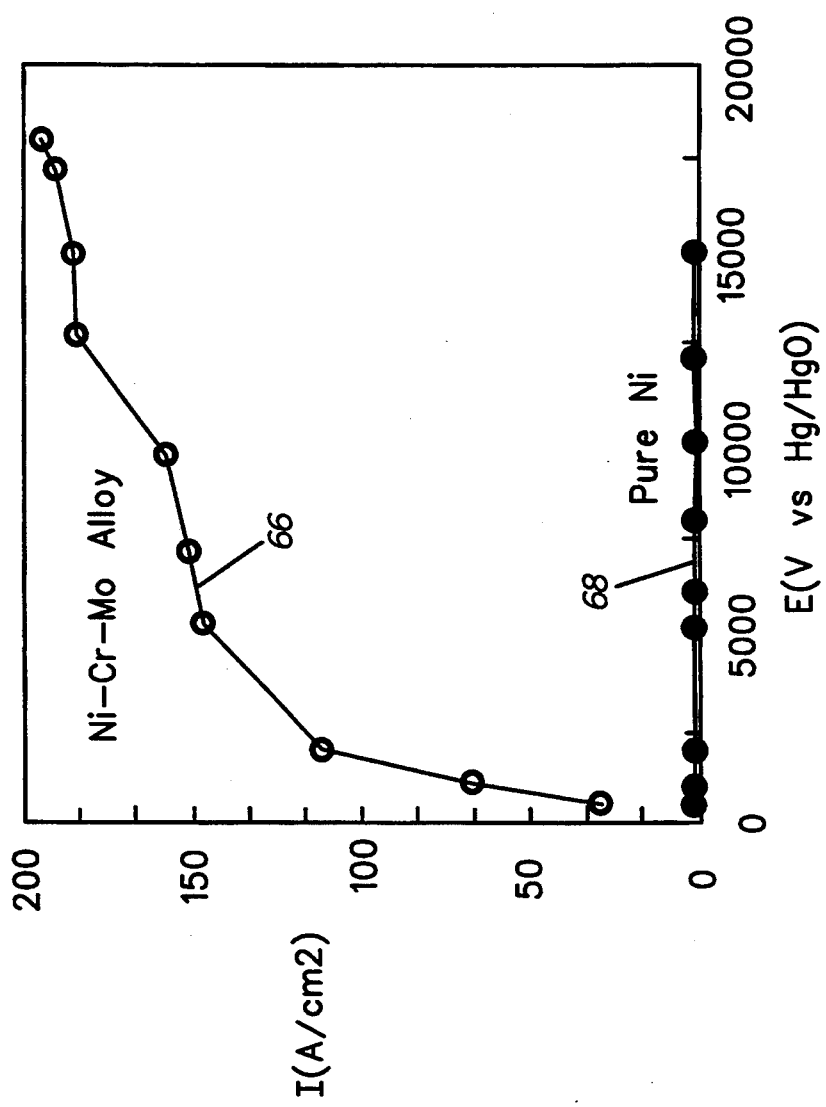
FIG. 3 illustrates the electrode capacity versus CV cycle number of a Ni—Cr—Mo alloy electrode and a pure Ni electrode tested in 31% KOH electrolyte at a sweep rate of 200 mV/s, in accordance with the instant invention.

Referring now to FIG. 2 and 3, there is illustrated therein a cyclic voltammagram (CV) taken at a 200 mV/s sweep rate, and a plot of charge density $mC/cm^2$ vs. cycle number for the flat NiCrMo alloy electrode, in a 31% KOH solution. For comparison purposes, FIG. 2 also includes a cyclic voltammagram for a pure nickel foil electrode. The performance of Ni, which is a known material in many electrochemical energy storage devices, is illustrated on line 60. The CV profile for the Ni—Cr—Mo alloy, line 62, showed a much greater current density and thus, a greater charge density, than that of pure Ni. This suggests an enhanced charge storage ability through alloying. In addition, under the condition of a 200 mV/s sweep rate, the charge/discharge efficiency was high, indicating relatively fast kinetics of the reaction.

Referring now to FIG. 3, there is illustrated therein the electrode capacity versus CV cycle number of a nickel-chromium-molybdenum alloy electrode and a pure nickel electrode, tested in 31% KOH electrolyte at a sweep rate of 200 mV/sec. in accordance with the instant invention. The results for the nickel-chromium-molybdenum alloy are illustrated on line 66 while that for the pure nickel electrode is illustrated on line 68. As maybe appreciated from a perusal of FIG. 3, the performance of the pure nickel electrode was extremely low in terms of charge density and remains so with increasing cycle number. Conversely the nickel-chromium-molybdenum alloy material begin with relatively low charge densities at low cycle numbers though increased to almost 200 mC/cm$^2$ by the 20,000th cycle. The results in FIG. 3 suggest that the electrode material needs to be activated, as by cycling, in order to achieve the high charge densities desired.

Figure 4:
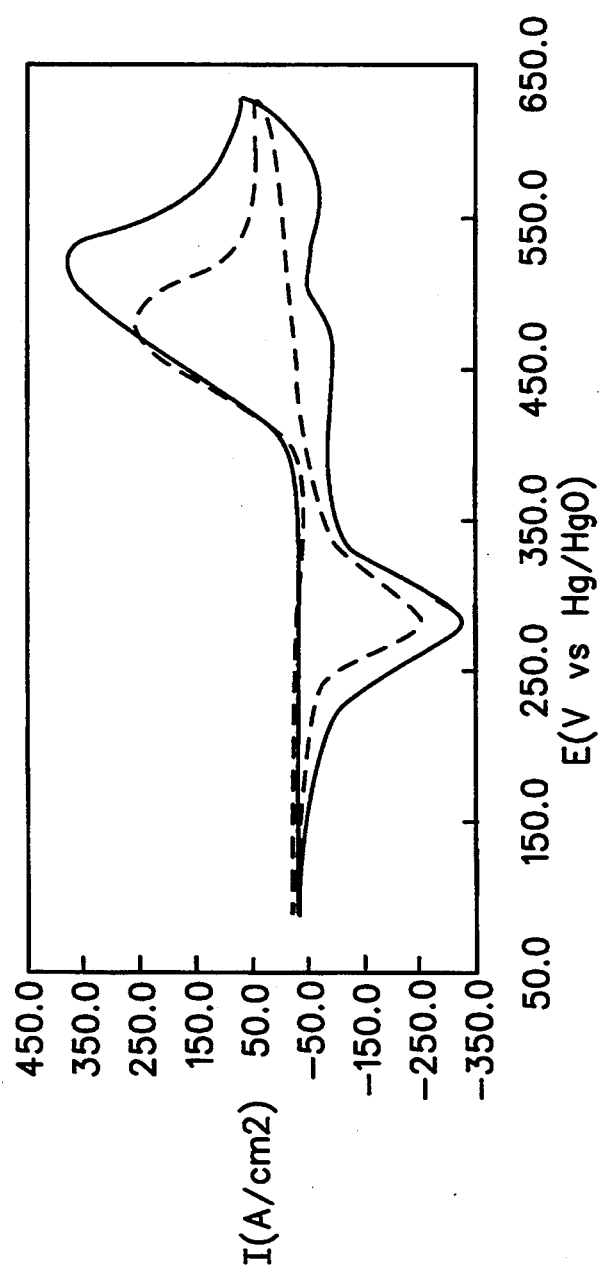
FIG. 4 illustrates the cyclic voltammagrams of a Ni—Cr—Mo alloy electrode tested in 31% KOH electrolyte at a sweep rate of 200 mV/s, after 2,000 cycles and after 20,000 cycles, in accordance with the instant invention.

Referring now to FIG. 4, there is illustrated therein a CV profile of the material described hereinabove at the 2,000th and 20,000th cycle wherein the 2,000th cycle is illustrated by trace 76 and the 20,000th cycle is illustrated by trace 78, at a sweep rate of 200 mV/sec. These results are illustrative of a enhanced charge storing ability and a good cycle life. This was not seen on the surface of pure Ni. Although the current density generally increases with the initial sweep rate, the current density of a pure nickel electrode is still considerably smaller than that of the nickel alloys described herein. After numerous potential cycling, surfaces of both Ni and Ni—Cr—Mo alloy were covered with a electrochemically active oxide film. However, the film on the later appeared to be much more conductive than the former. Accordingly, NiCrMo appear to be much more electrochemically active than the pure nickel alloy.

Example II

Figure 5:
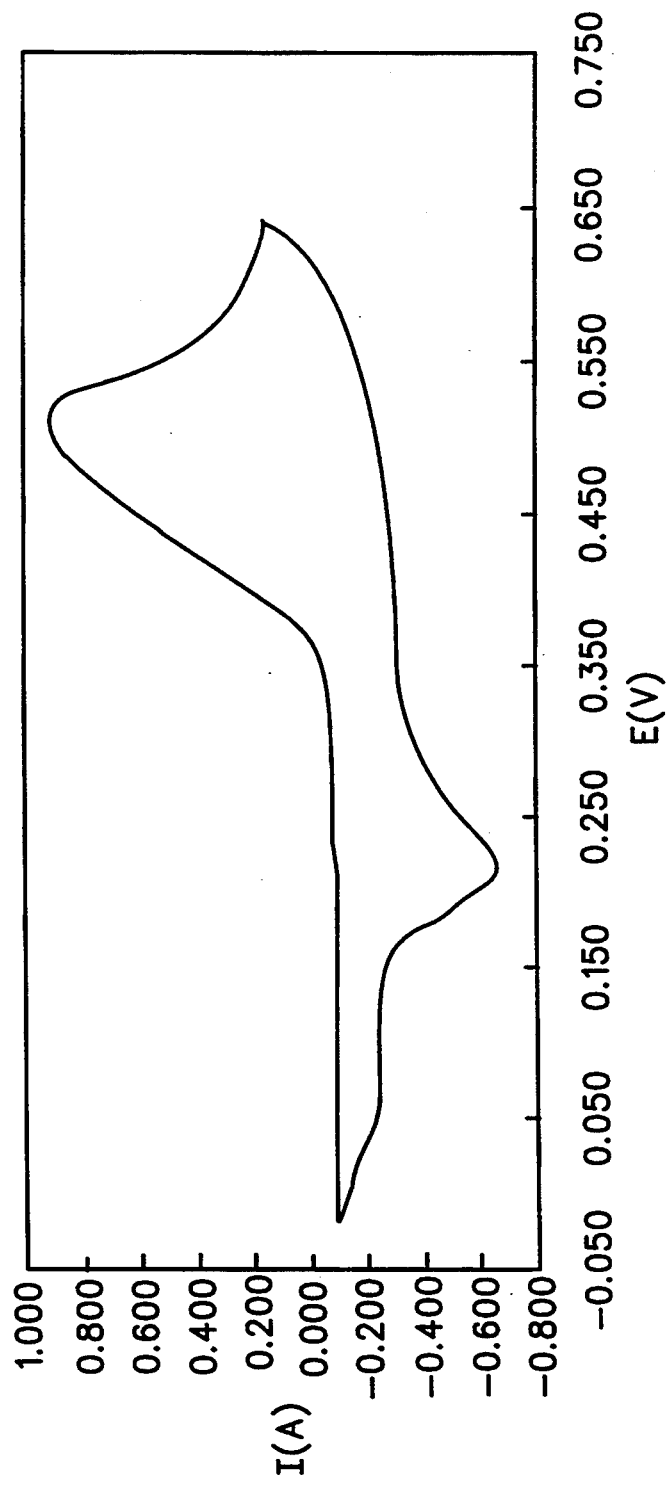
FIG. 5 illustrates a cyclic voltammagram of a Ni—Cr—Co—Mo alloy electrode tested in 31% KOH electrolyte at a sweep rate of 150 mV/s, after the electrode was cycled for 24,000 cycles, in accordance with the instant invention.
Figure 6:
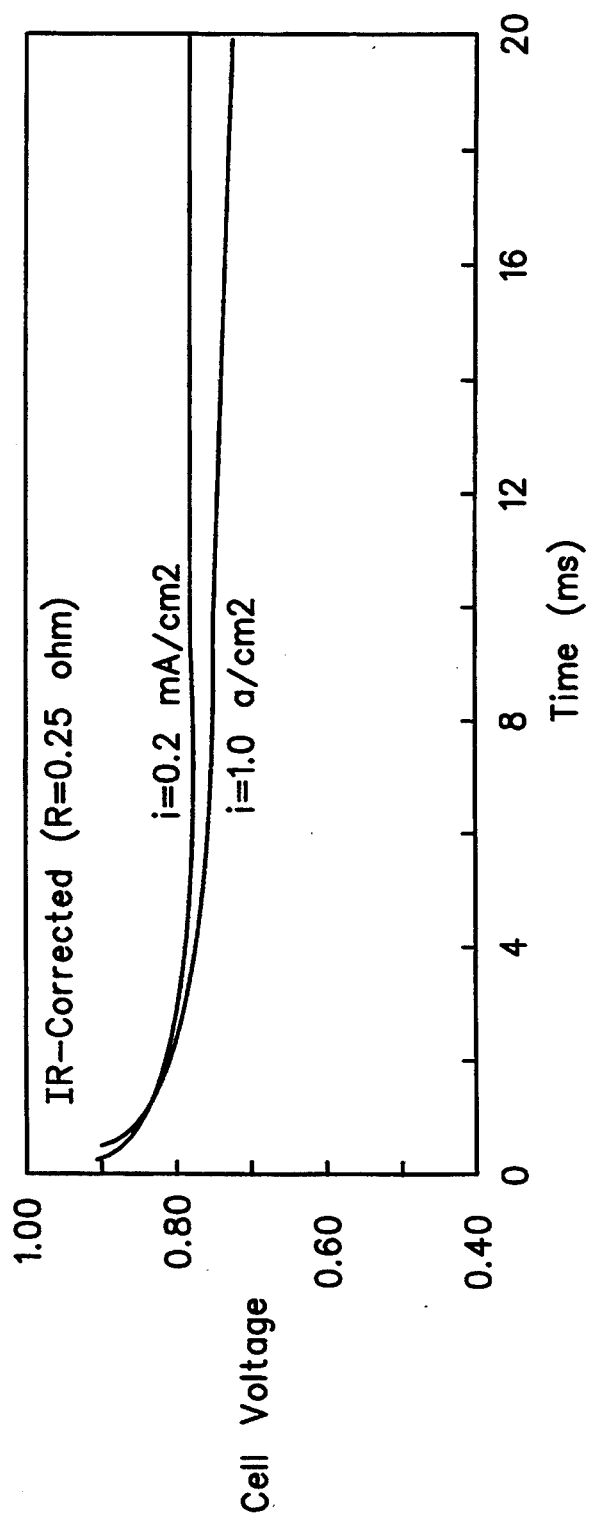
FIG. 6 illustrates IR-corrected constant current discharging curves obtained from a Ni—Cr—Co—Mo alloy cathode/31% KOH electrolyte/Bi anode electrochemical cell, in accordance with the instant invention.

A second nickel alloy having the composition Ni$_{55.4}$Cr$_{19}$Co$_{11}$Mo$_{11}$Al$_{1.5}$Ti$_{3.1}$ was tested to determine its electrochemical properties. The material is also commercially available as a structural alloy and is known as Reni 41. A first sample of the material had a surface area of approximately 3.8 cm$^2$. Referring now to FIG. 5, there is illustrated therein a CV profile at a sweep rate of 150 mV/sec, after the electrode described above had been cycled to 24,000 times. The capacity of the electrode was 0.25 C/cm$^2$. This electrode has been used successfully as a cathode coupled with a bismuth anode to form a electrochemical device having characteristics of a high power battery device. FIG. 6 illustrates IR-corrected constant current discharging curves obtained from a Ni—Cr—Co—Mo alloy cathode/31% KOH/Bi anode electrochemical cell. A flat discharge curve profile representing a battery-type behavior was observed even at relatively high current density. These results suggest that electrodes could be useful for high power pulse applications.

Example III

A third nickel alloy having the composition Ni$_{72}$Mo$_{28}$ was tested to determine the electrochemical properties. The material is commercially available as a structural alloy, and is known as Hastelloy B-2. A first sample of the material had an area of approximately 0.9 cm$^2$.

Figure 7:
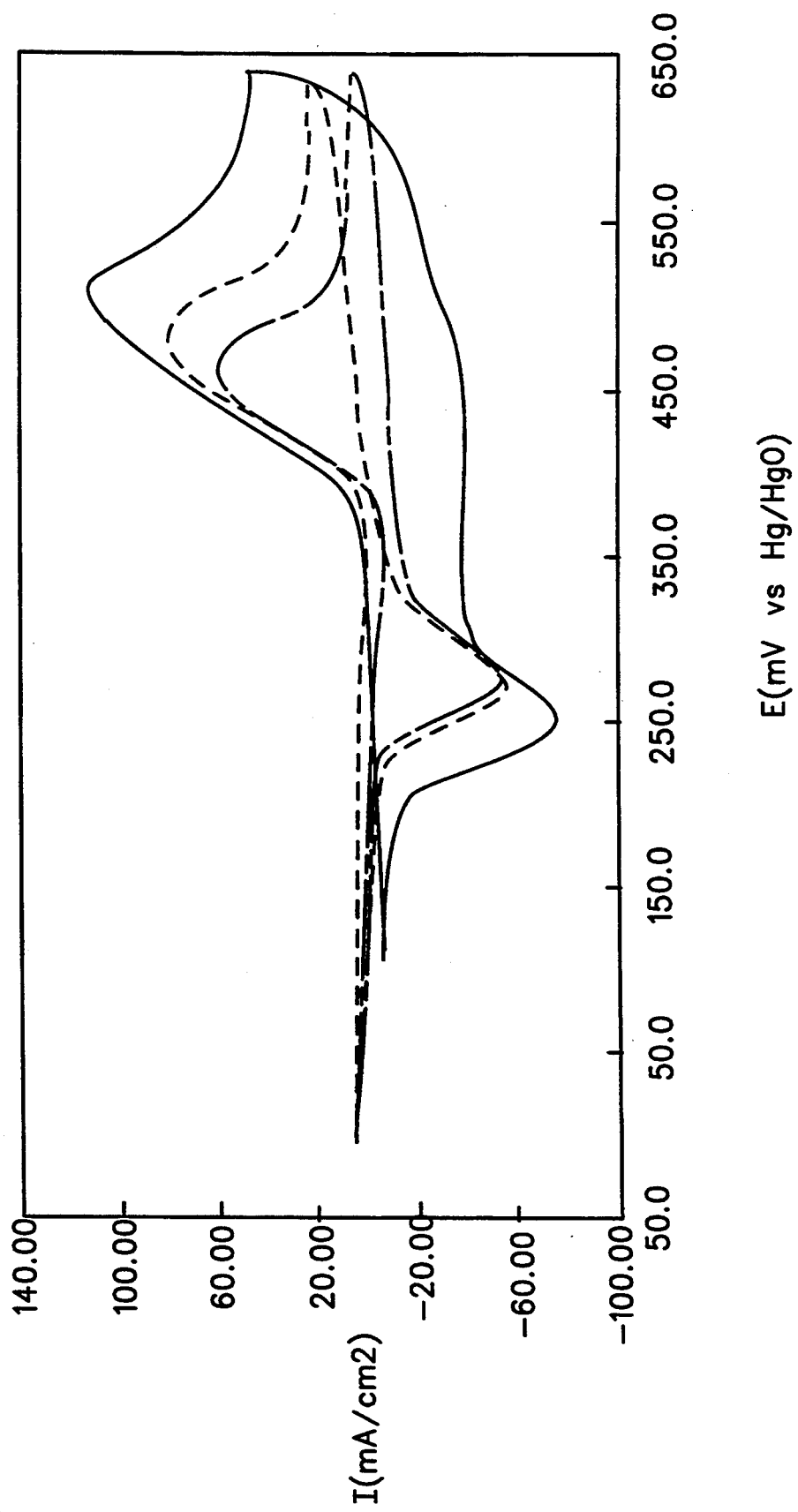
FIG. 7 illustrates the cyclic voltammagrams of a Ni—Mo alloy electrode tested in 31% KOH electrolyte at a sweep rate of 200 mV/s, after 200 cycles (dotted line), 2,000 cycles and 20,000 cycles in accordance with the instant invention.
Figure 4:
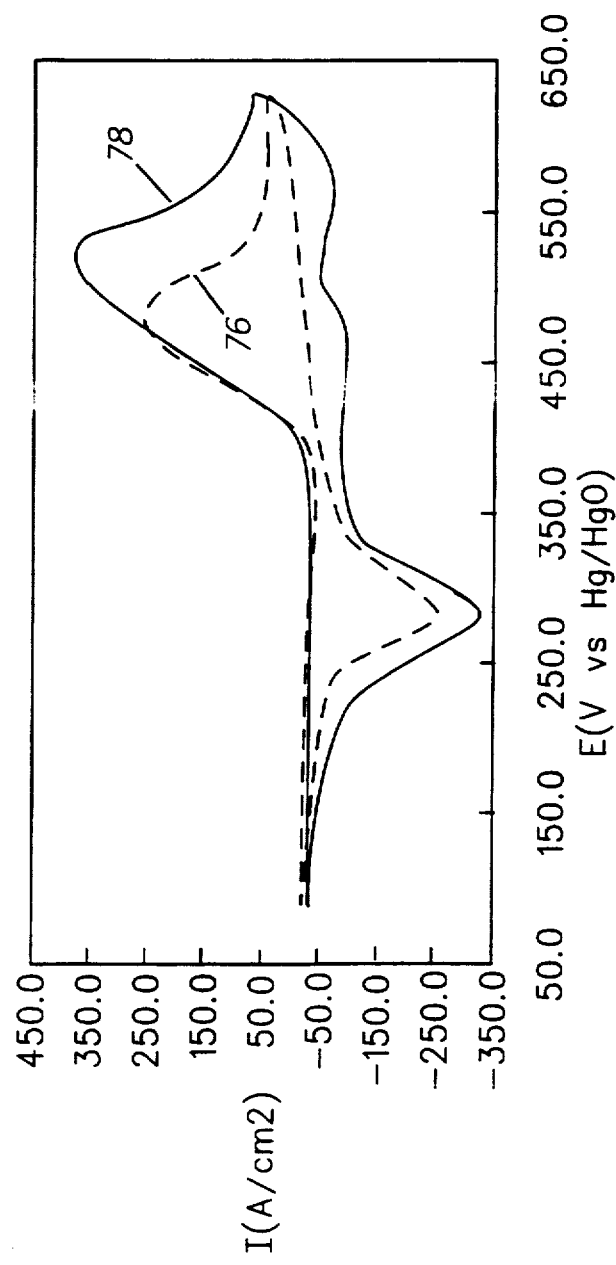
Figure 7:
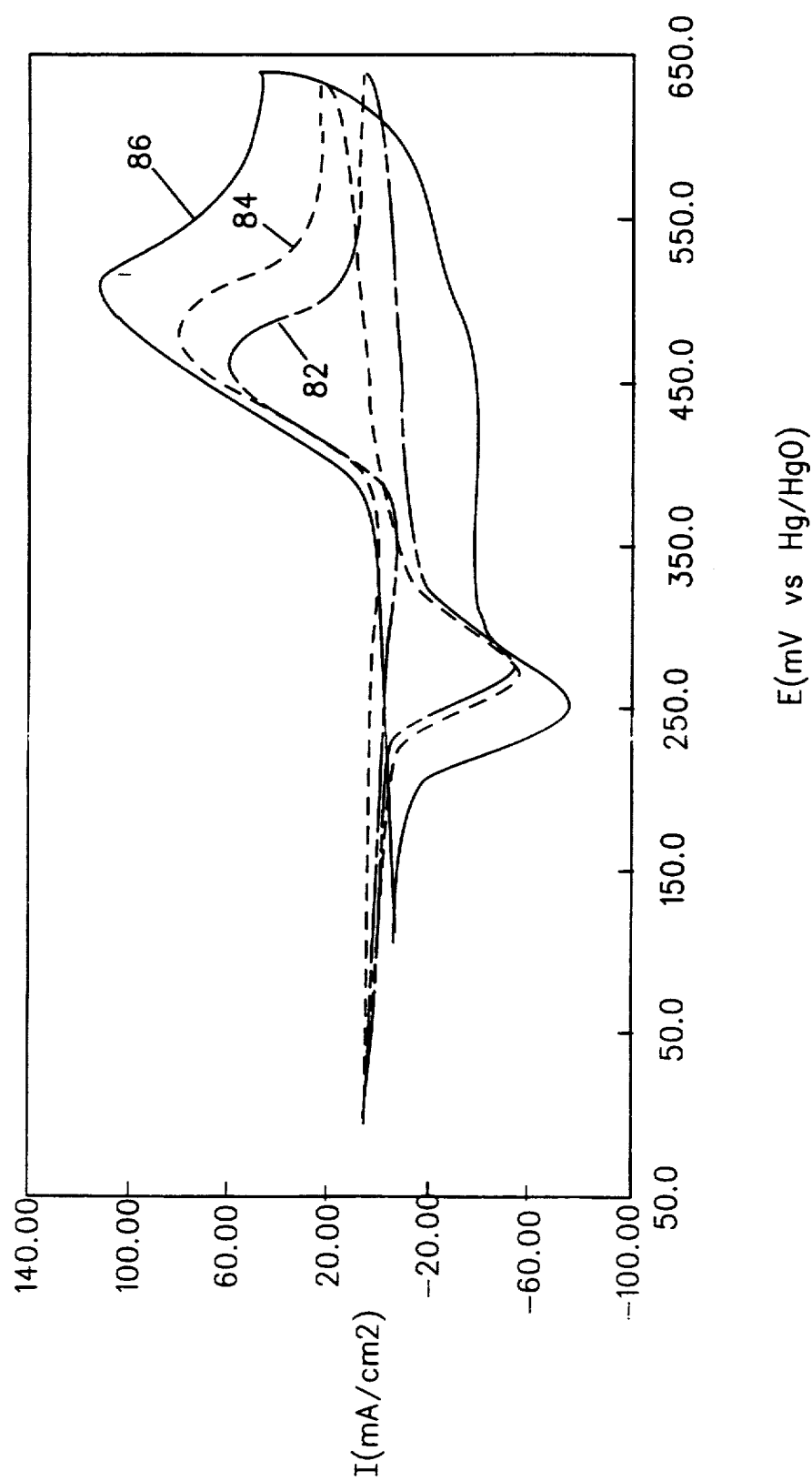

Referring now to FIG. 7, there is illustrated a CV profile of a nickel molybdenum alloy tested in 31% KOH electrolyte. The CV was cycled at a sweep rate of 200 mV/sec., with the CV taken at the 200th (line 82) 2,000th (line 84), 20,000th (line 86) cycles illustrated therein. As maybe appreciated from a perusal of FIG. 7, no deterioration in the performance of the alloy material was observed. In addition, the reaction kinetics was also quite fast, since charge/discharge can be performed readily at a relatively high sweep rate (200 mV/s). The electrochemical behavior of this electrode is also comparable with the Ni—Cr—Mo and Ni—Cr—Co—Mo alloys described hereinabove with respect to Examples I and II.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable electrode for a rechargeable electrochemical capacitor device, said electrode having an oxidation/reduction charge storage mechanism, and comprising a multi-component material having host having a host matrix selected from the group consisting of nickel, molybdenum,chromium, and combinations thereof, and at least one modifier selected from the group consisting of cobalt, iron, aluminum, titanium, tungsten,vanadium, zirconium, niobium, and combinations thereof.

2. A rechargeable electrode material as in claim 1, wherein said material has the formula

Ni$_a$Mo$_b$Cr$_c$M$_d$ where M is the modifier, a is between 30 and 90, b is between 10 to 50, c is between 10 and 50, and d is between 0 and 30.

3. A rechargeable electrode material as in claim 1, wherein said material has the formula Ni$_{58.5}$Cr$_{2.1}$Mo$_{13.5}$W$_3$Fe$_4$.

4. A rechargeable electrode material as in claim 1, wherein said material has the formula Ni$_{55.4}$Cr$_{19}$Co$_{11}$Mo$_{11}$Al$_{1.5}$Ti$_{3.1}$.

5. A rechargeable electrode material as in claim 1, wherein said material has the formula Ni$_{72}$Mo$_{28}$.

6. A rechargeable electrode material as in claim 1, wherein said material has the formula Ni$_{58.7}$, Co$_{13.5}$, Cr$_{19.5}$, Mo$_{4.3}$, Al$_{l.3}$, Ti$_{3.0}$.

7. A rechargeable electrode material as in claim 1, wherein said material is a crystalline or polycrystalline material.

8. A rechargeable electrode material as in claim 7, wherein said crystalline material has a face-centered cubic crystallographic structure.

9. A rechargeable electrode material as in claim 7, where said material is a multiphase material.

10. A rechargeable electrode material as in claim 1, wherein said material is a single phase amorphous material.

11. A rechargeable electrochemical capacitor charge storage device comprising:
   an anode;
   an electrolyte; and
   a cathode having an oxidation/reduction charge storage mechanism, and comprising a multi-component material having a host matrix selected from the group consisting of nickel, molybdenum, chromium and combinations thereof, and at least one modifier selected from the group consisting of cobalt, iron, aluminum, titanium, tungsten, vanadium, zirconium, niobium and combinations thereof and their oxides.

12. A rechargeable electrochemical capacitor as in claim 11, wherein said cathode is fabricated of a material having the formula:

$$Ni_a Mo_b Cr_c M_d$$

where M is said modifier, a is between 30 and 90, b is between 10 to 50 and c is between 10 and 50, and d is between 0 and 30.

13. A rechargeable electrochemical capacitor as in claim 11, wherein said material has the formula $Ni_{58.5}Cr_{21}Mo_{13.5}W_3Fe_4$.

14. A rechargeable electrochemical capacitor as in claim 11, wherein said material has the formula $Ni_{55.4}Cr_{19}Co_{11}Mo_{11}Al_{1.5}Ti_{3.1}$.

15. A rechargeable electrochemical capacitor as in claim 11, wherein said material has the formula $Ni_{72}Mo_{28}$.

16. A rechargeable electrochemical capacitor as in claim 11, wherein said material has the formula $Ni_{58.7}, Co_{13.5}, Cr_{19.5}, Mo_{4.3}, Al_{1.3}, Ti_{3.0}$.

17. A rechargeable electrochemical capacitor as in claim 11, wherein said material is crystalline or polycrystalline.

18. A rechargeable electrochemical capacitor as in claim 17, wherein said crystalline material has a face-centered cubic crystallographic structure.

19. A rechargeable electrochemical capacitor as in claim 17, wherein said material is multiphase.

20. A rechargeable electrochemical capacitor as in claim 17, wherein said material is a single phase amorphous material.

* * * * *

UNITED STATES PATENT AND TRADEMARK OFFICE
CERTIFICATE OF CORRECTION

PATENT NO. : 5,429,895
DATED : July 4, 1995
INVENTOR(S) : Lian, et al

It is certified that error appears in the above-indentified patent and that said Letters Patent is hereby corrected as shown below:

Column 6, Line 37 between "material" and "having" delete [having host]

Column 6, Line 39 insert a space between molybdenum, and chromium

Column 6, Lines 42, insert a space between tungsten, and vanadium

Figure 4, insert Lead Line Reference Nos. 76 and 78, and in

Figure 7, insert 4, Lead Line Reference Nos. 82, 84, and 86, as shown on the attached pages.

Signed and Sealed this

Seventh Day of November, 1995

Attest:

BRUCE LEHMAN

Attesting Officer

Commissioner of Patents and Trademarks